(12) United States Patent
Hsieh

(10) Patent No.: US 8,262,292 B2
(45) Date of Patent: Sep. 11, 2012

(54) BICYCLE HEADSET

(75) Inventor: Ming-Lun Hsieh, Taichung (TW)

(73) Assignee: Tien Hsin Industries Co., Ltd., Taichung (TW)

( * ) Notice: Subject to any disclaimer, the term of this patent is extended or adjusted under 35 U.S.C. 154(b) by 0 days.

(21) Appl. No.: 13/197,832

(22) Filed: Aug. 4, 2011

(65) Prior Publication Data

US 2012/0063712 A1 Mar. 15, 2012

(30) Foreign Application Priority Data

Sep. 10, 2010 (TW) .............................. 99217647 U

(51) Int. Cl.
*F16C 13/00* (2006.01)
*B62K 21/06* (2006.01)
*B62K 21/12* (2006.01)

(52) U.S. Cl. ........ 384/545; 384/537; 384/548; 280/279; 74/551.1

(58) Field of Classification Search ................... 384/537, 384/539, 545, 548, 570, 540; 280/271–272, 280/279–280; 74/493, 495, 551.1–551.8
See application file for complete search history.

(56) References Cited

U.S. PATENT DOCUMENTS

| | | | | |
|---|---|---|---|---|
| 582,279 A * | 5/1897 | Gold | ............................. | 280/272 |
| 2,623,573 A * | 12/1952 | Di Gaetano | ................... | 280/283 |
| 5,330,220 A * | 7/1994 | Nagano | ........................ | 280/279 |
| 5,332,245 A * | 7/1994 | King | ............................. | 74/551.1 |
| 5,496,126 A * | 3/1996 | Lin | ................................ | 74/551.1 |
| 5,681,119 A * | 10/1997 | Marui | .......................... | 384/545 |
| 6,003,890 A * | 12/1999 | Inouye | ......................... | 280/270 |
| 6,343,806 B1* | 2/2002 | Lee | ................................ | 280/272 |
| 6,523,847 B1* | 2/2003 | Chien | .......................... | 280/280 |
| 6,651,525 B2* | 11/2003 | Jiang | ............................. | 384/540 |
| 6,729,634 B2* | 5/2004 | Tange | .......................... | 280/279 |
| 7,441,961 B2* | 10/2008 | Li | ................................ | 384/545 |
| 7,625,002 B2* | 12/2009 | Huang | ......................... | 280/279 |
| 7,661,885 B2* | 2/2010 | Lin | ................................ | 384/545 |
| 7,731,445 B2* | 6/2010 | Coaplen | ....................... | 280/279 |
| 2004/0007850 A1* | 1/2004 | Crozet et al. | .................. | 280/280 |
| 2006/0055146 A1* | 3/2006 | Ueno | ........................... | 280/280 |
| 2008/0159678 A1* | 7/2008 | Lin | ................................ | 384/545 |
| 2011/0121537 A1* | 5/2011 | Lin | ................................ | 280/279 |

FOREIGN PATENT DOCUMENTS

TW 353447 2/1999
WO WO 2010025544 A1 * 3/2010

* cited by examiner

*Primary Examiner* — Marcus Charles
(74) *Attorney, Agent, or Firm* — Alan Kamrath; Kamrath IP Lawfirm, PA

(57) ABSTRACT

A bicycle headset includes a lower cup, a bearing, a pressed ring, and an upper cup. The lower cup includes a first surface and a block extended on the first surface. The bearing is engaged in the lower cup. The pressed ring is rotatably engaged in the bearing. The upper cup is rotatably engaged with the lower cup and includes a second surface facing the first surface, and a channel extended in the second surface and having an arc shape. The channel includes first and second stop walls. The channel receives the block and includes the first and second stop walls selectively abutted against the block. The first and second stop walls are distanced from each other with an arc length. The arc length has an angle not greater than 180 degrees.

8 Claims, 12 Drawing Sheets

BICYCLE HEADSET

BACKGROUND OF THE INVENTION

1. Field of the Invention

The present invention relates to a bicycle headset for journaling a steering tube of a fork assembly in a head tube of a bicycle frame and, in particular, to a bicycle headset adapted to prevent the steering tube from being overturned relative to the head tube.

2. Description of the Related Art

A conventional bicycle headset for a bicycle can journal a steering tube of a fork assembly in a head tube of a bicycle frame and allow the steering tube to rotate relative to the head tube. Generally, the steering tube faces a first orientation when riding the bicycle in a straight forward direction and is turned clockwise through an angle from the first orientation when making a right turn and is turned counterclockwise through an angle from the first orientation when making a left turn. Additionally, the steering tube is adapted to be turned through an angle of 90 degrees or more from the first orientation. As a result, a rider can have more freedom to negotiate curves. Unfortunately, this is not safe and potentially risky. For instance, if the steering tube is turned through an angle from the first orientation to an angle of substantially 90 degrees or more while riding, a rider is liable to lose control and fall off the bicycle.

TW Patent No. 353447 shows a bicycle headset including a plurality of balls that facilitates the operation of turning a steering tube of a fork assembly relative to a head tube of a bicycle frame. Yet, the aforementioned problem is not resolved.

The present invention is, therefore, intended to obviate or at least alleviate the problems encountered in the prior art.

SUMMARY OF THE INVENTION

According to the present invention, a bicycle headset for journaling a steering tube of a fork assembly in a head tube of a bicycle frame includes a lower cup, a bearing, a pressed ring, and an upper cup. The lower cup includes first and second ends, a first hole extending therethrough and longitudinally from the first end to the second end, a first surface defined at the second end, and a block extended on the first surface. The lower cup further includes the first end having a first outer periphery and the second end having a second outer periphery respectively. The first outer periphery has a first diametrical size, and the second end has a second diametrical size respectively. The first diametrical size is smaller than the second diametrical size. The bearing is engaged in the first hole of the lower cup and includes a second hole extending therethrough. The pressed ring is rotatably engaged in the second hole of the bearing and includes a third hole extending therethrough. The upper cup is rotatably engaged with the lower cup and includes a fourth hole extending therethrough, a second surface facing the first surface, and a channel extended in the second surface and having an arc shape. The channel includes first and second stop walls. The channel receives the block and includes the first and second stop walls selectively abutted against the block. The first and second stop walls are distanced from each other with an arc length. The arc length has an angle not greater than 180 degrees.

The upper cup is stopped from being moved in a first direction when the block is abutted against the first stop wall and in a second direction when the block is abutted against the second stop wall, with the first direction opposite to the second direction.

Additionally, the lower cup includes the first end received in the head tube and the first hole receiving the steering tube when the bicycle headset interconnects the steering tube and the head tube.

It is an object of the present invention to provide a bicycle headset that resolves the aforementioned problem mentioned in the description of the related prior art.

Other objects, advantages, and new features of the present invention will become apparent from the following detailed description of the invention when considered in conjunction with the accompanied drawings.

DETAILED DESCRIPTION OF THE PREFERRED EMBODIMENTS

Figure 1:
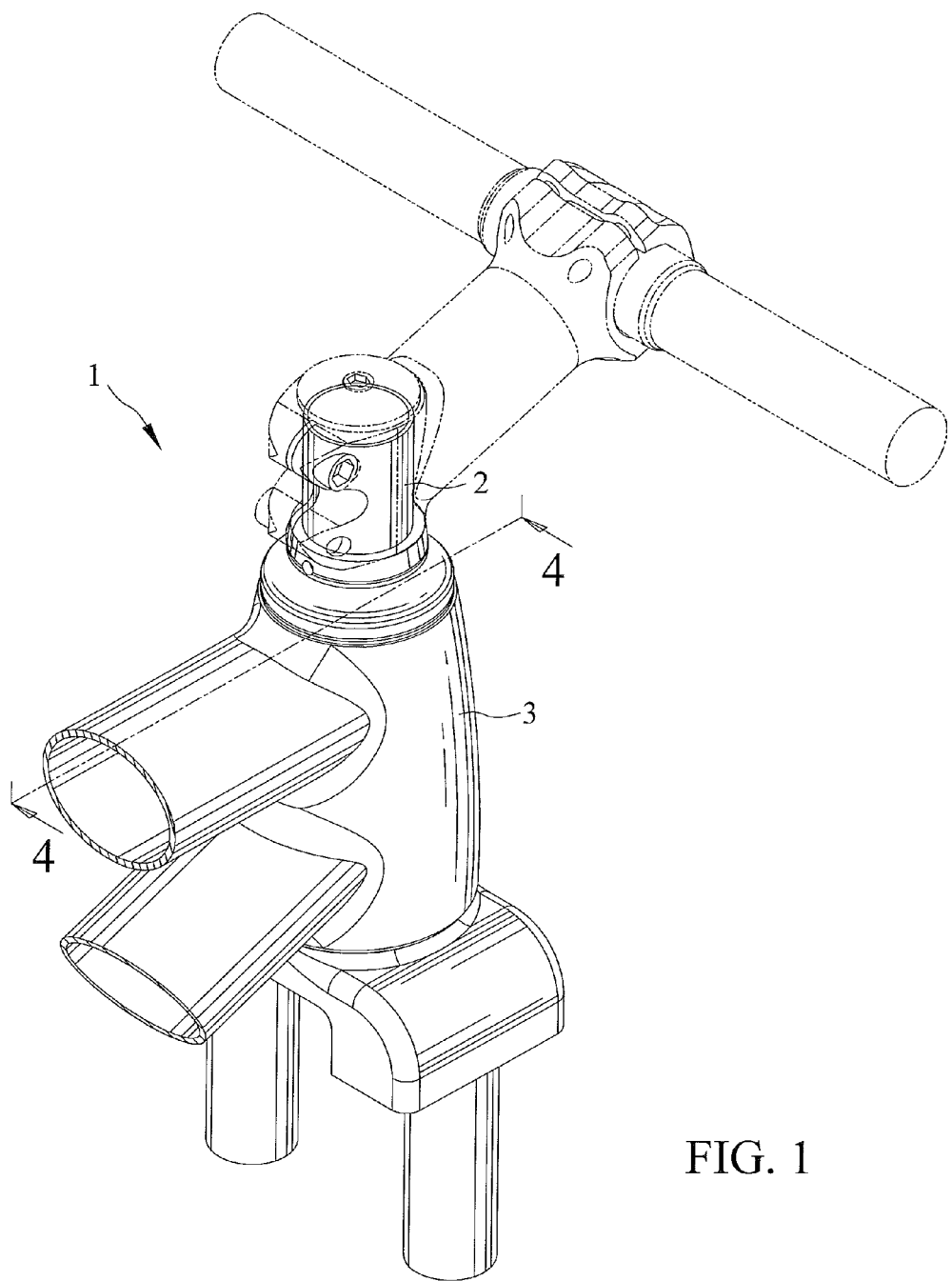
FIG. 1 is a perspective view of a bicycle headset in accordance with a first embodiment of the present invention, with the bicycle headset journaling a fork assembly in a head tube of a bicycle frame, with the fork assembly including a stem attached thereto, with the stem including a handle bar attached thereto, with the stem and the handle bar shown in phantom.
Figure 2:
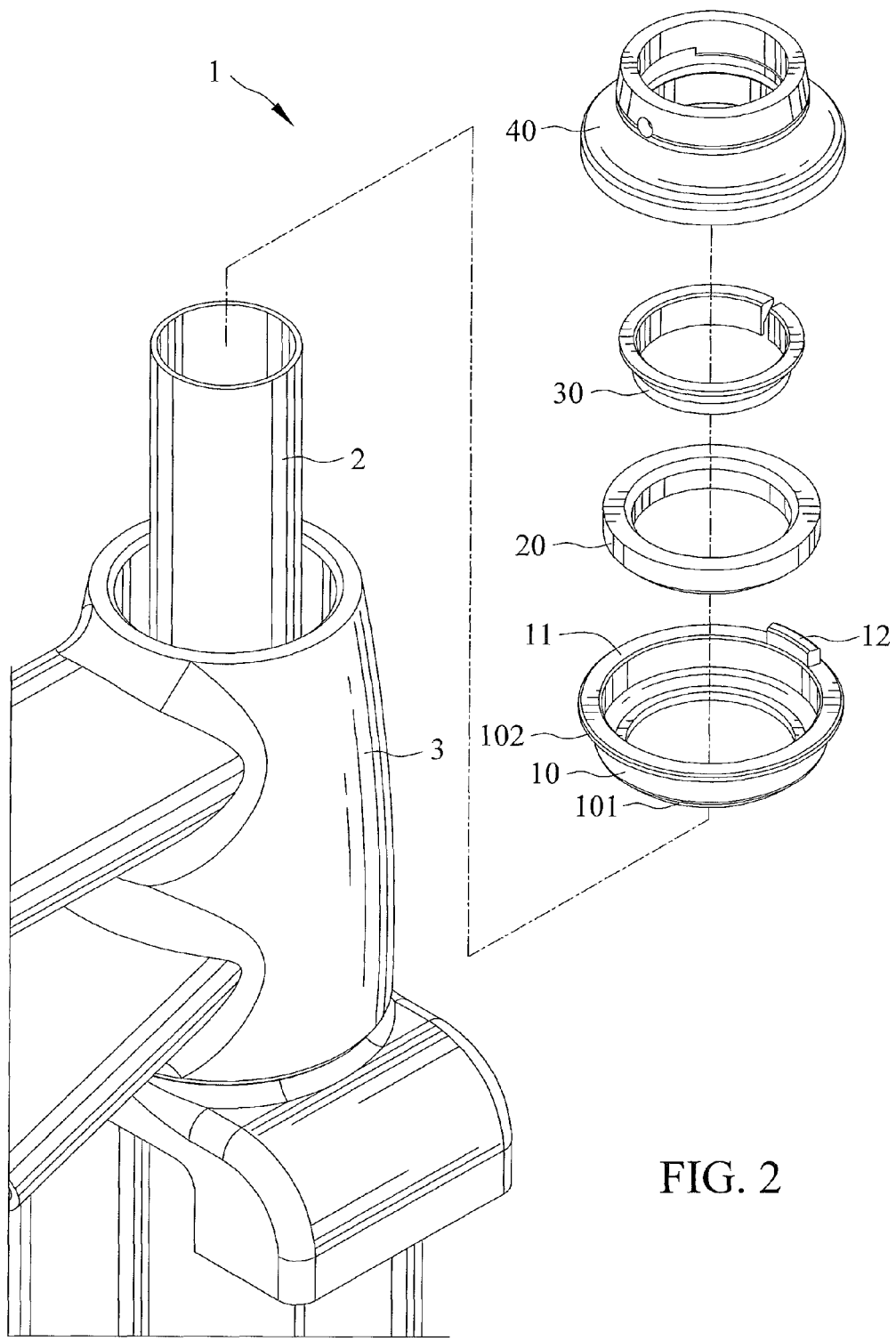
FIG. 2 is an exploded perspective view of the bicycle headset of FIG. 1.
Figure 3:
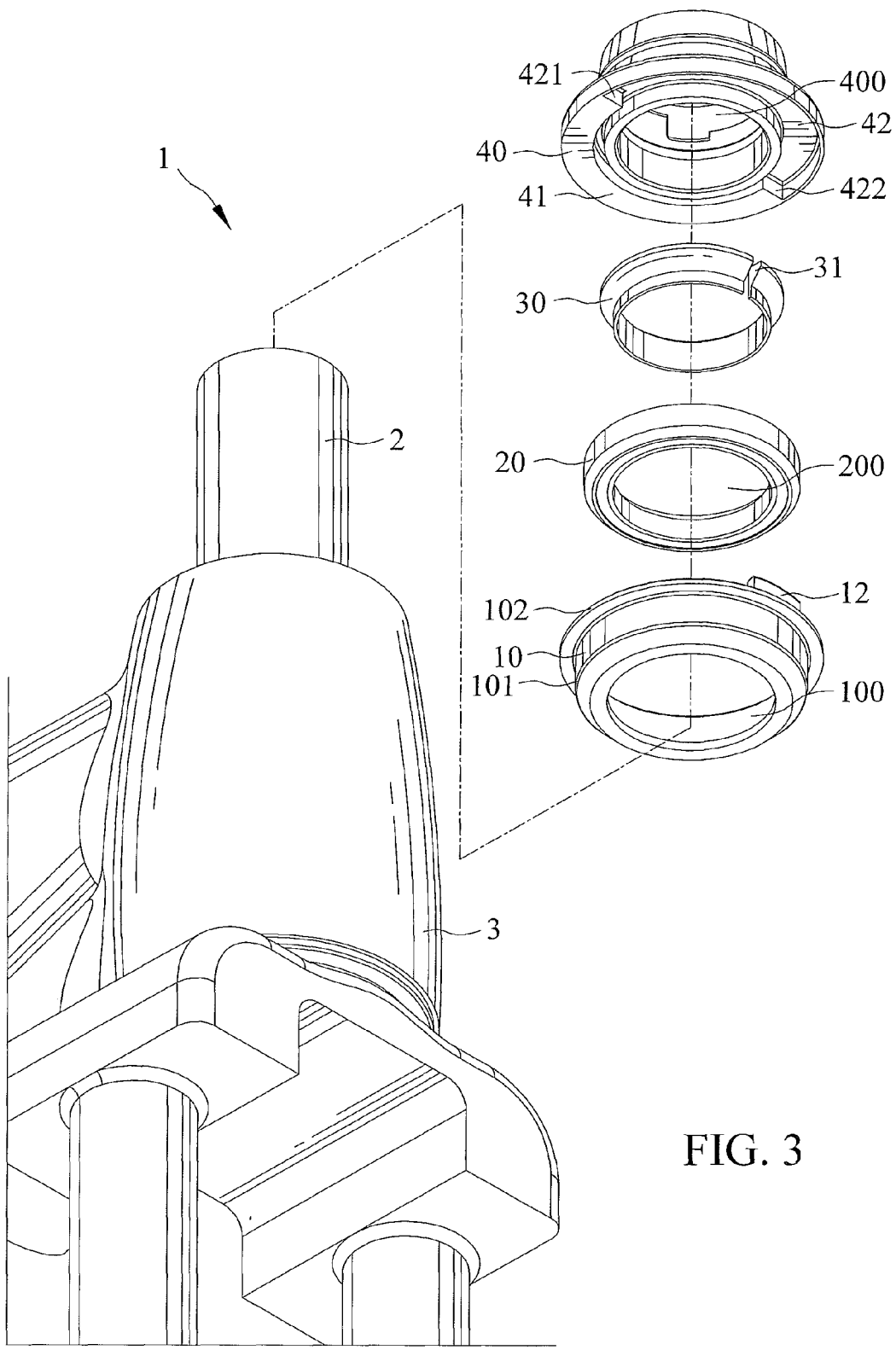
FIG. 3 is an exploded perspective view of the bicycle headset of FIG. 1, taken from a different view than the view of FIG. 2.
Figure 4:
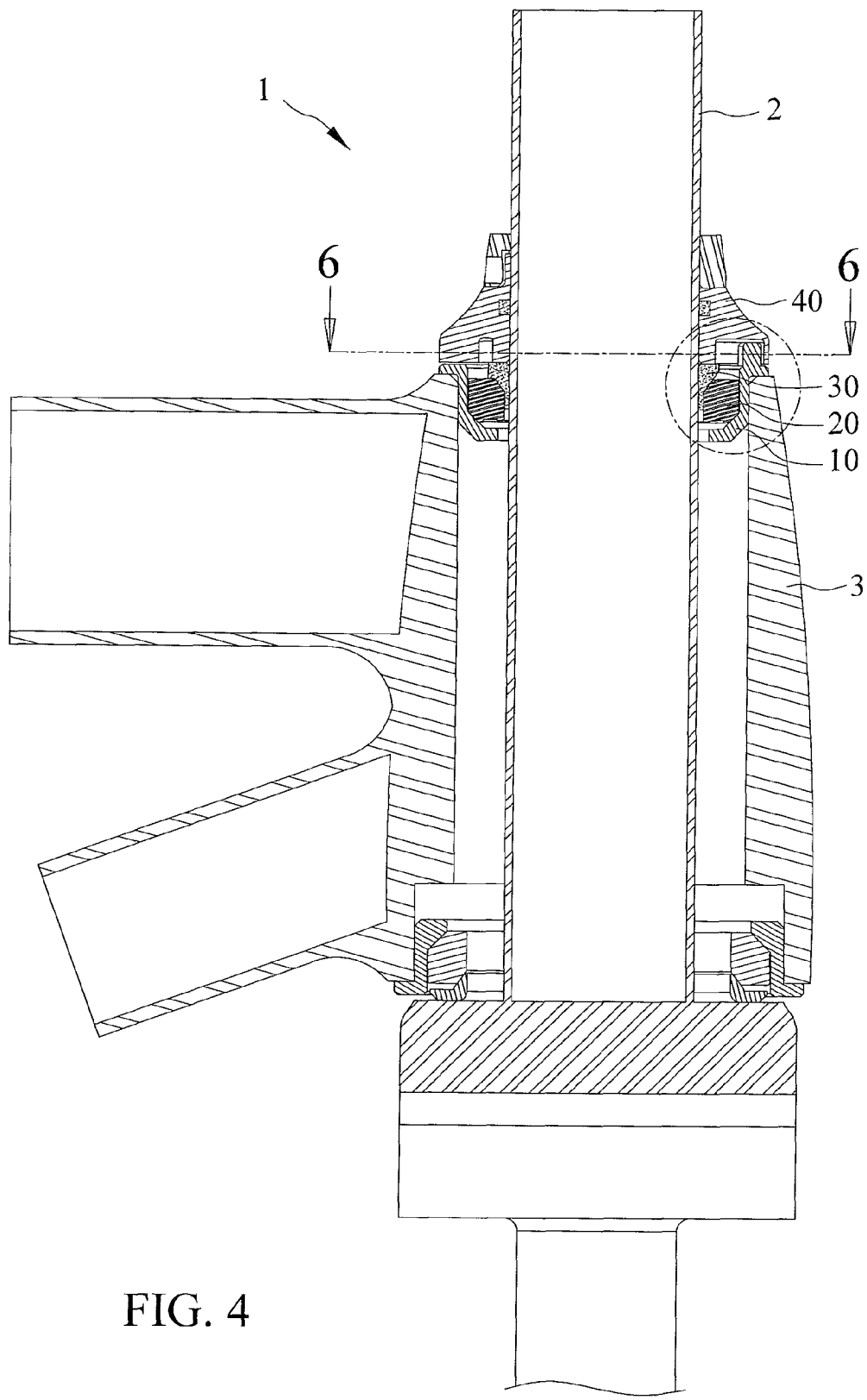
FIG. 4 is a cross-sectional view taken along line 4-4 of FIG. 1.
Figure 5:
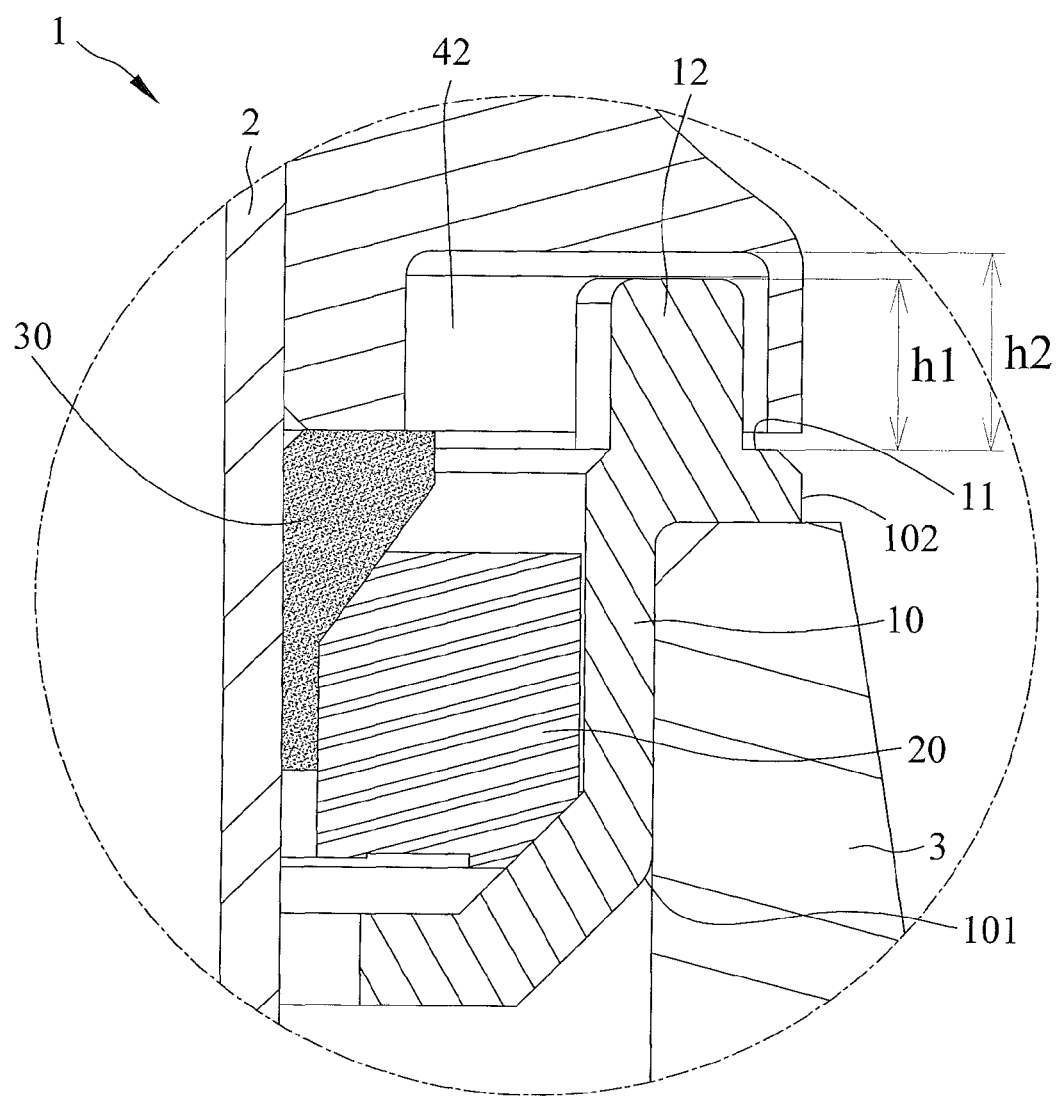
FIG. 5 is an enlarged view of FIG. 4.
Figure 6:
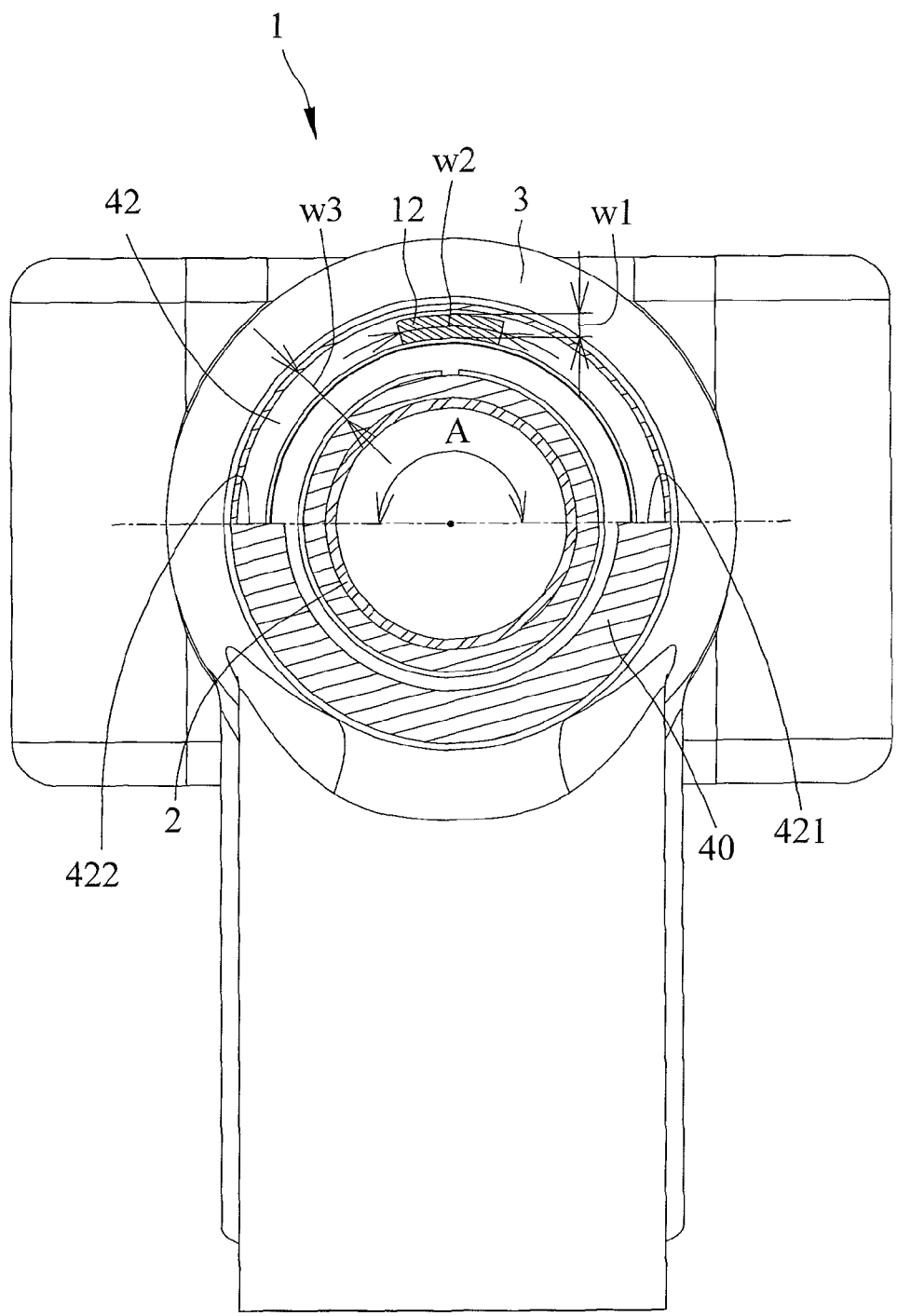
FIG. 6 is a cross-sectional view taken along line 6-6 of FIG. 4.
Figure 7:
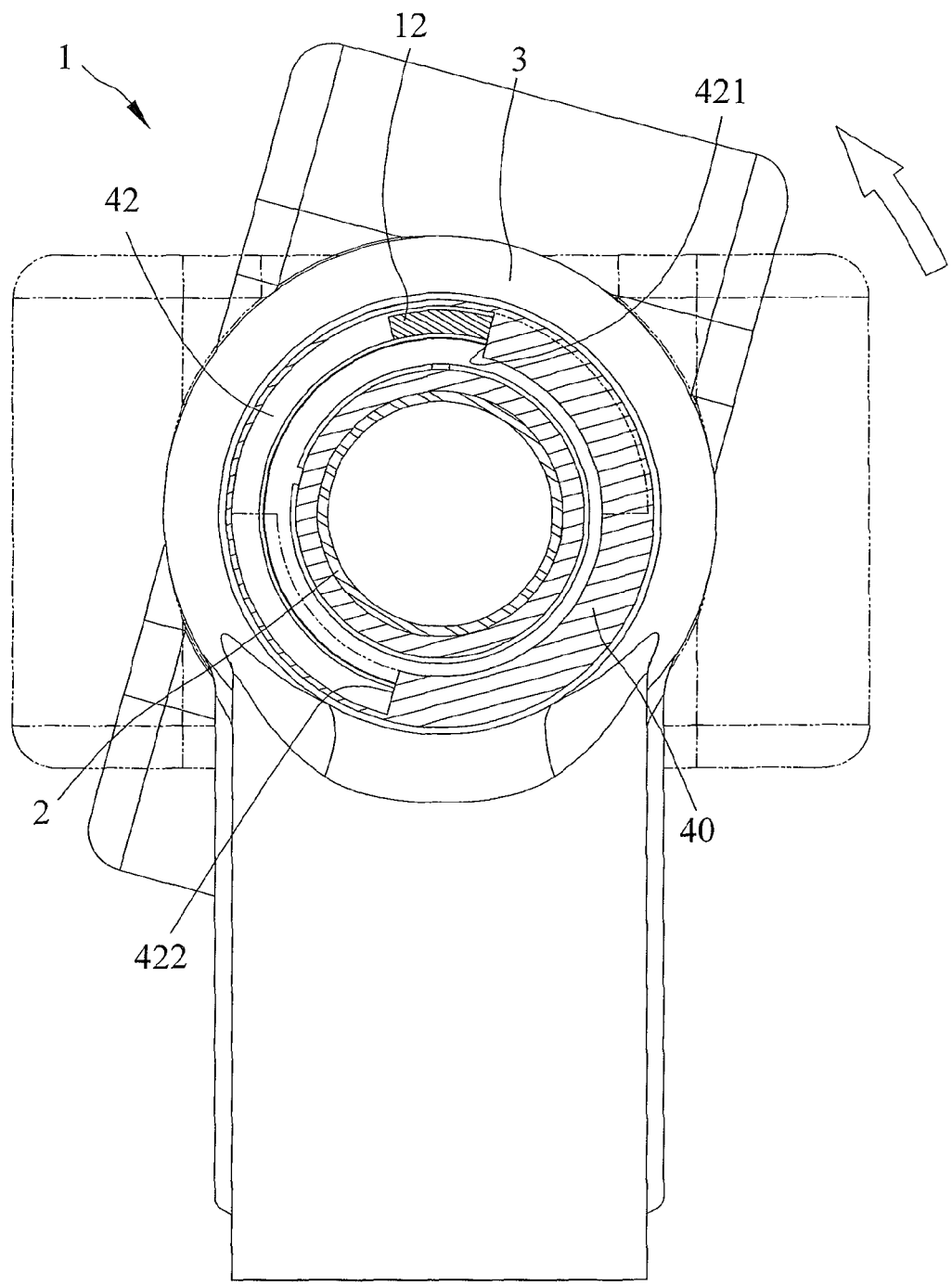
FIG. 7 is a cross-sectional view similar to FIG. 6, with the fork assembly turned to an orientation different from that of FIG. 6, with the fork assembly prevented from being further turned counterclockwise.
Figure 8:
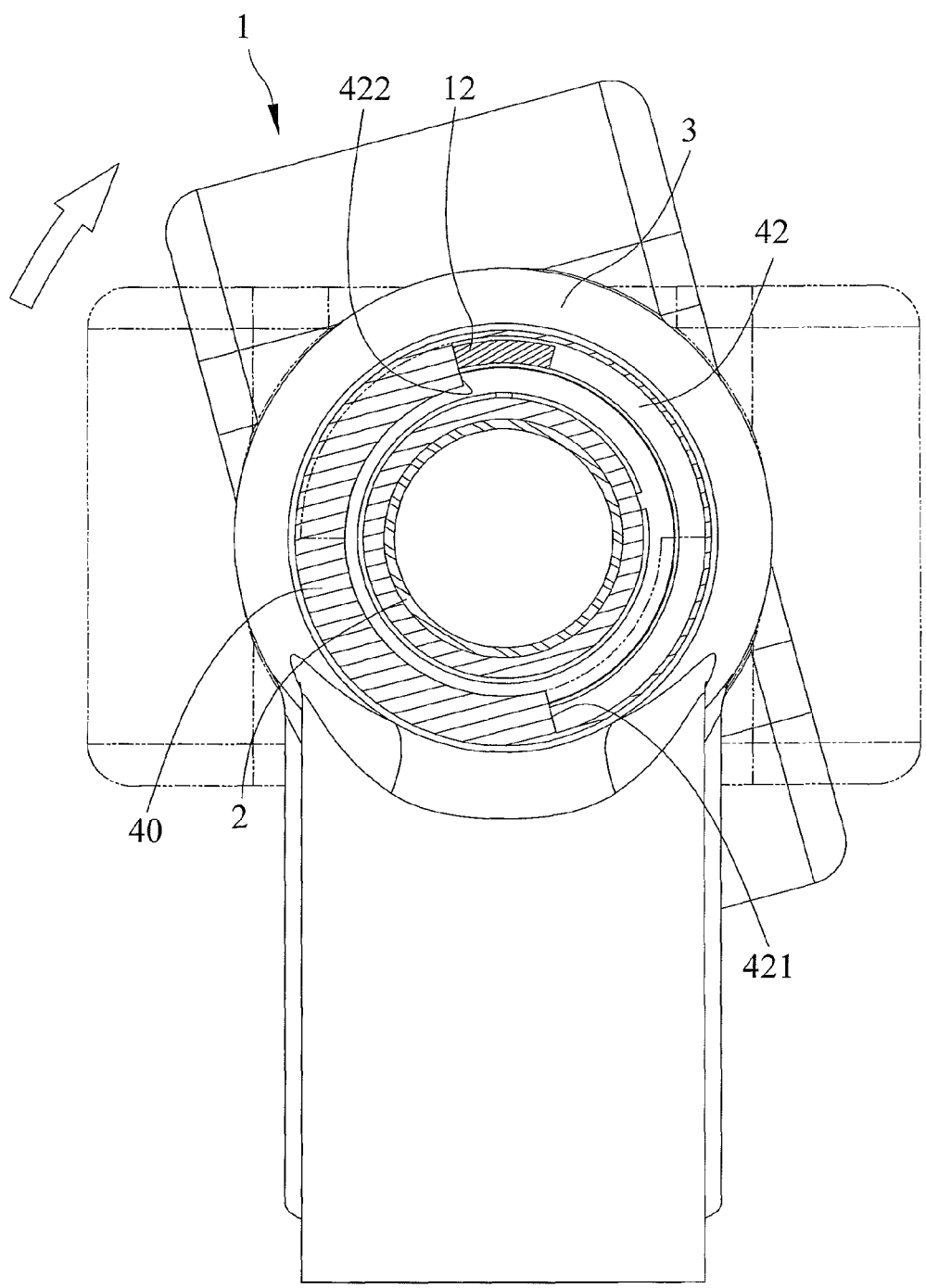
FIG. 8 is a cross-sectional view similar to FIG. 6, with the fork assembly turned to an orientation different from that of FIG. 6, with the fork assembly prevented from being further turned clockwise.

FIGS. 1 through 8 show a bicycle headset 1 for journaling a steering tube 2 of a fork assembly in a head tube 3 of a bicycle frame in accordance with a first embodiment of the present invention. The bicycle headset 1 includes a lower cup 10, a bearing 20, a pressed ring 30, and an upper cup 40.

The lower cup 10 includes first and second ends 101 and 102, a hole 100 extending therethrough and longitudinally from the first end 101 to the second end 102, a surface 11 defined at the second end 102, and a block 12 extended on the surface 11. The block 12 includes an arc shape including two arcuate first lateral sides disposed opposite to each other and two second lateral sides extending radially between the two first lateral sides. The two first lateral sides have the same radius of curvature and are distanced from each other at a first width W1. The two second lateral sides are distanced at a second width W2. The second width W2 is larger than the first width W1. The block 12 includes first and second distal ends defining the two second lateral sides respectively.

The lower cup 10 further includes the first end 101 having a first outer periphery and the second end 102 having a second outer periphery respectively. The first outer periphery has a first diametrical size, and the second end has a second diametrical size respectively. The first diametrical size is smaller than the second diametrical size. The lower cup 10 has an enclosed peripheral edge.

The bearing 20 is engaged in the hole 100 of the lower cup 10 and includes a hole 200 extending therethrough. The bearing 20 has an enclosed peripheral edge.

The pressed ring 30 is rotatably engaged in the hole 200 of the bearing 20 and includes a hole 300 extending therethrough. Moreover, the pressed ring 30 includes first and second terminal ends and has a longitudinal length defining a distance between the first and second terminal ends. Moreover, the pressing ring 30 further includes a circumferential edge, and a slit 31 extending radially through the circumferential edge and connecting with the hole 300. Additionally, the slit 31 includes first and second terminal ends forming two openings.

The upper cup 40 is rotatably engaged with the lower cup 10. The upper cup 40 includes a hole 400 extending therethrough, a surface 41 facing the surface 11, and a channel 42 extended in the surface 41 and having an arc shape. The channel 42 includes two arcuate first lateral peripheral walls disposed oppositely and distanced from each other at a third width W3. The third width W3 is larger than the first width W1. Therefore, the channel 42 would not interfere with the block 12.

The channel 42 includes first and second stop walls 421 and 422. The channel 42 receives the block 12 and includes the first and second stop walls 421 and 422 selectively abutted against the block 12. The first and second stop walls 421 and 422 are distanced from each other with an arc length A. The arc length A has an angle not greater than 180 degrees. The upper cup 40 is stopped from being moved in a first direction when the block 12 including the first distal end abuts against the first stop wall 421 and in a second direction when the block 12 including the second distal end abuts against the second stop wall 422, with the first direction opposite to the second direction. As set forth, the block 12 includes the second width W2 greater than the first width W1 and is therefore able to withstand shearing stress.

Furthermore, the block 12 includes a top end, and a bottom end opposing to the top end and disposed on the surface 11. The top end is distanced from the surface 11 at a first height h1. Furthermore, the channel 42 includes a bottom wall facing and spaced from the top end. The bottom wall is distanced from the surface 11 at a second height h2. The first height h1 is smaller than the second height h2. Therefore, the block 12 would not interfere with the bottom wall of the channel 42.

Additionally, the lower cup 10 includes the first end 101 received in the head tube 3 and the hole 100 receiving the steering tube 2 when the bicycle headset interconnects the steering tube 2 and the head tube 3.

Figure 9:
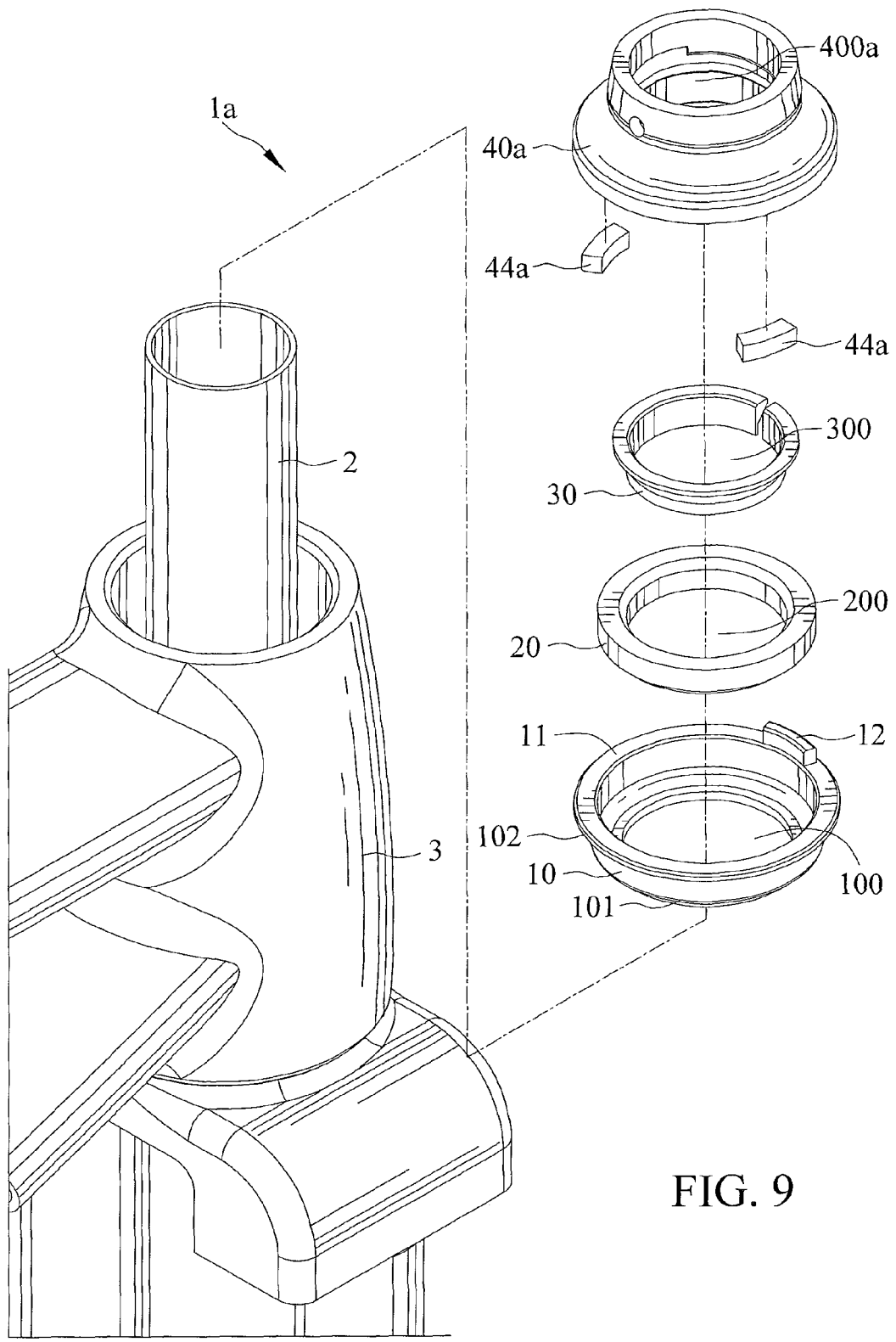
FIG. 9 is an exploded perspective view of a bicycle headset in accordance with a second embodiment of the present invention.
Figure 10:
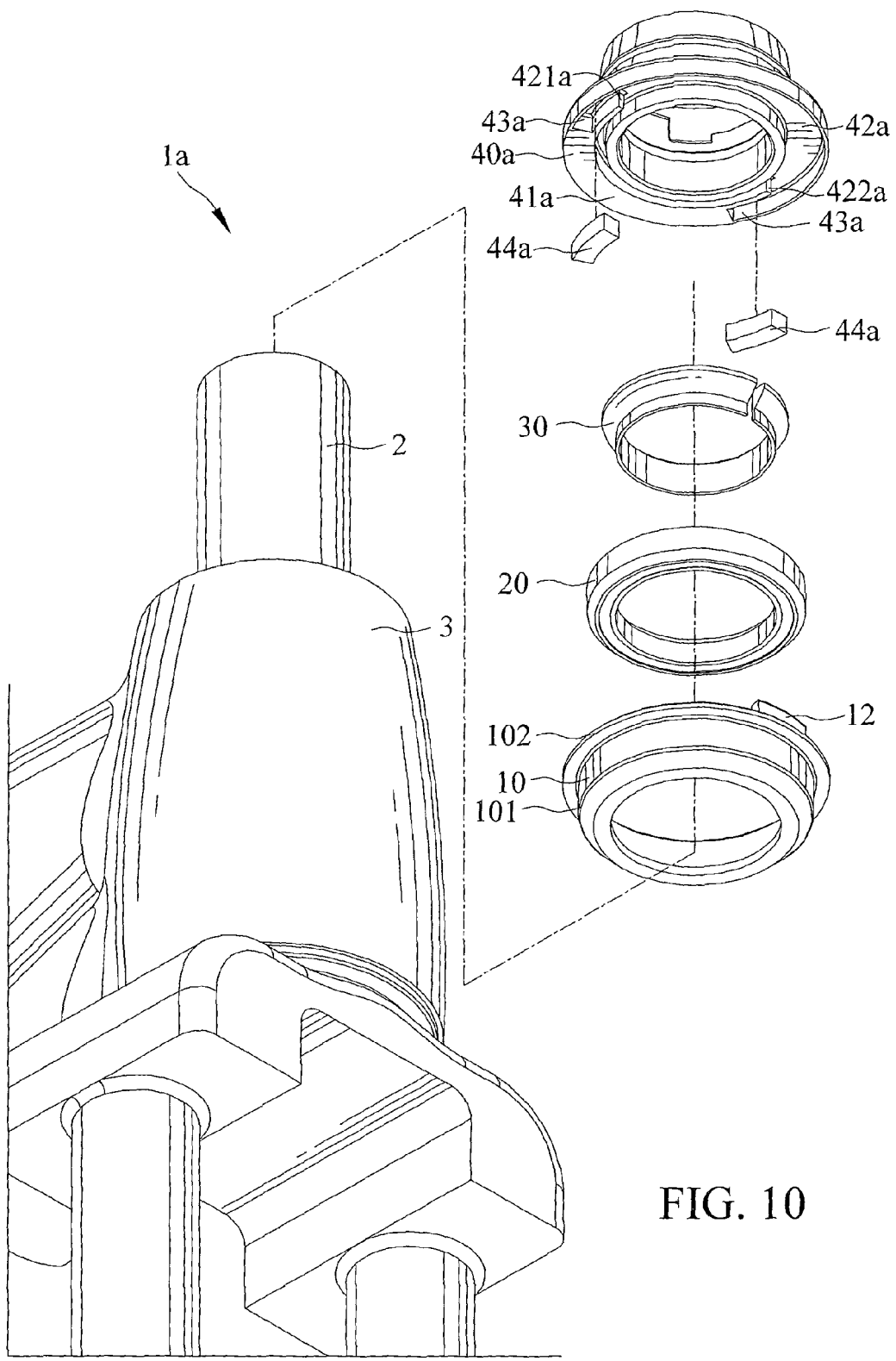
FIG. 10 is an exploded perspective view of the bicycle headset of FIG. 9, taken from a different view than the view of FIG. 9.
Figure 11:
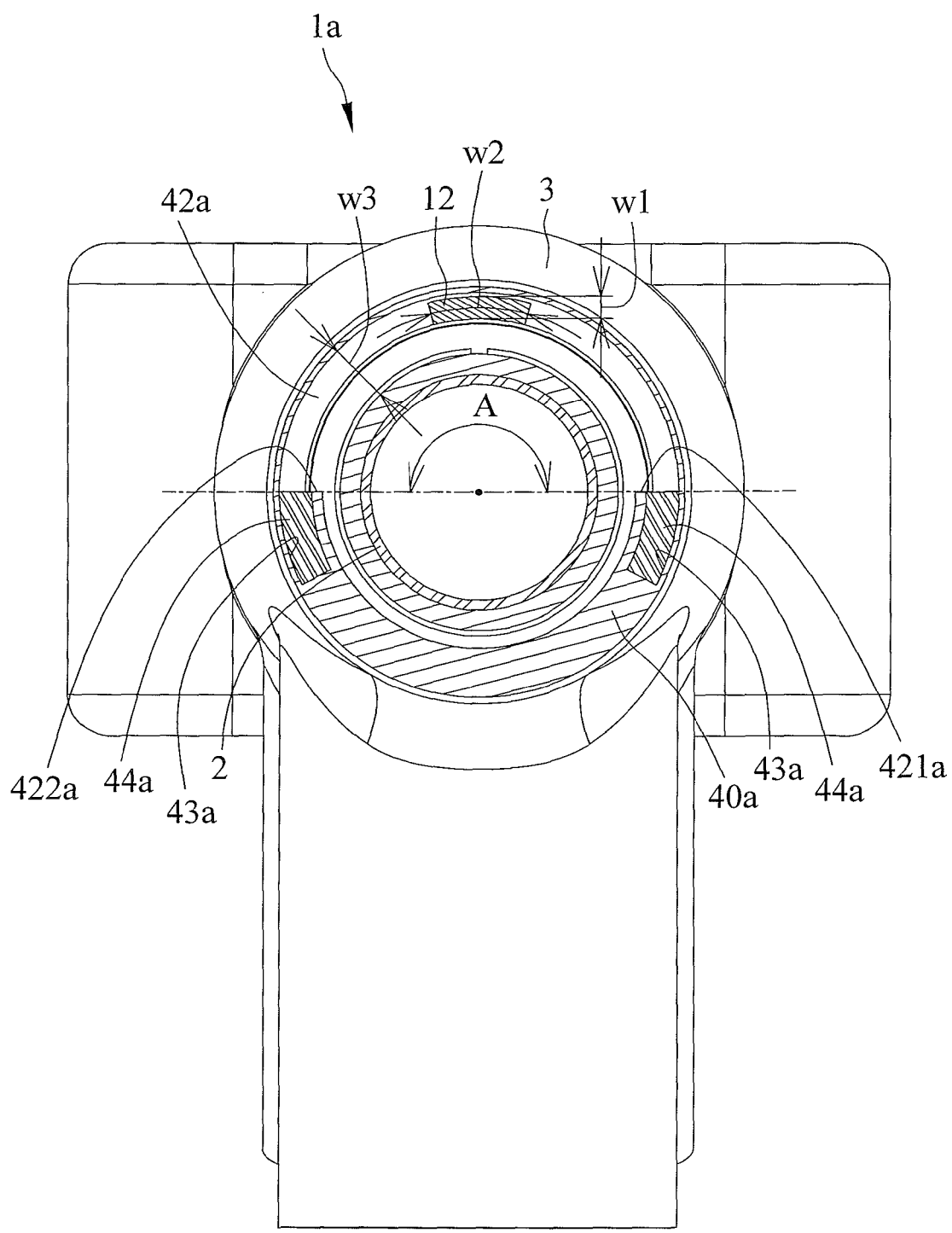
FIG. 11 is a cross-sectional view of the bicycle headset of FIG. 9.

FIGS. 9 through 11 show a bicycle headset 1a in accordance with a second embodiment of the present invention. The bicycle headset 1a differentiates from the bicycle headset 1 in that it includes an upper cup 40a. The upper cup 40a includes a hole 400a extending therethrough, a surface 41a, and two cavities 43a extended in the surface 41a and distanced from each other. Likewise, the upper cup 40a includes a channel 42a. The two cavities 43a are interconnected by the channel 42a. Further, two shock dampers 44a are insertably disposed in the two cavities 43a respectively. Further, first and second stop walls 421a and 422a are defined on the first and second shock dampers 44a respectively.

Figure 12:
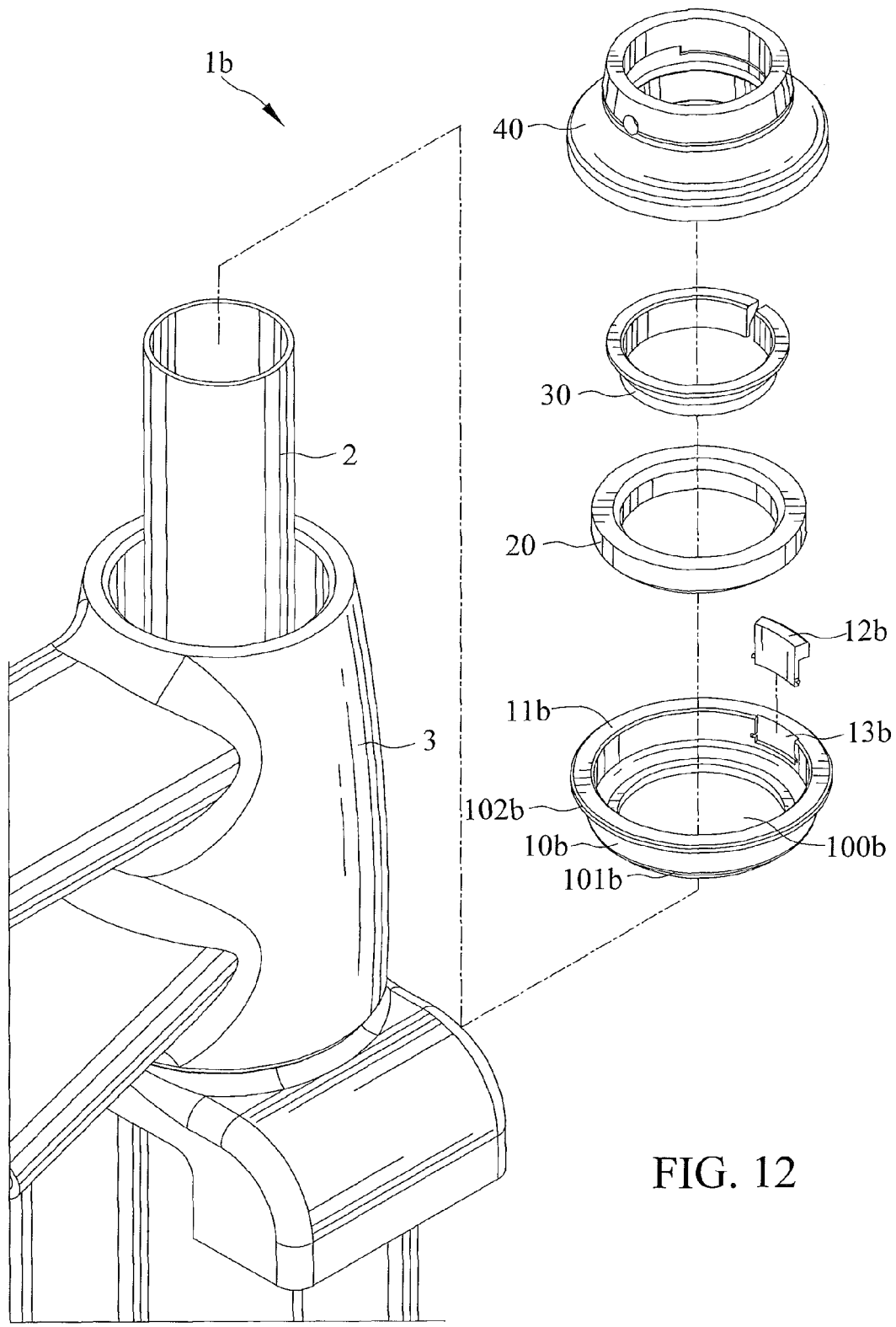
FIG. 12 is an exploded perspective view of a bicycle headset in accordance with a third embodiment of the present invention.

FIG. 12 shows a bicycle headset 1b in accordance with a third embodiment of the present invention. The bicycle headset 1b differentiates from the bicycle headset 1 in that it includes a lower cup 10b. The lower cup 10b includes first and second ends 101b and 102b, a hole 100b extending therethrough and from the first end 101b to the second end 102b, a surface 11b, a block 12b, and a recess 13b extended in the second end 102b. The block 12b is insertably disposed in the recess 13b.

Additionally, the surfaces 11, 11b, 41, and 41a are flat surfaces.

In view of the forgoing, the bicycle headsets 1, 1a, 1b can prevent the steering tube 2 from being turned 90 degrees or more while riding since the first and second stop walls 421, 421a; 422, 422a are distanced from each other with the arc length that has the angle A not greater than 180 degrees.

While the specific embodiments have been illustrated and described, numerous modifications come to mind without significantly departing from the spirit of invention, and the scope of invention is only limited by the scope of the accompanying claims.

What is claimed is:

1. A bicycle headset for journaling a steering tube of a fork assembly in a head tube of a bicycle frame, comprising:

a lower cup including first and second ends, a first hole extending therethrough and longitudinally from the first end to the second end, a first surface defined at the second end, and a block extended on the first surface, with the lower cup including the first end having a first outer periphery and the second end having a second outer periphery respectively, with the first outer periphery having a first diametrical size and the second end having a second diametrical size respectively, with the first diametrical size smaller than the second diametrical size;

a bearing engaged in the first hole of the lower cup and including a second hole extending therethrough;

a pressed ring rotatably engaged in the second hole of the bearing and including a third hole extending therethrough; and an upper cup rotatably engaged with the lower cup and including a fourth hole extending therethrough, a second surface facing the first surface, and a channel extended in the second surface and having an arc shape, with the channel including first and second stop walls, with the channel receiving the block and including the first and second stop walls selectively abutted against the block, with the first and second stop walls distanced from each other with an arc length with the arc length having an angle not greater than 180 degrees;

wherein the first and second surfaces are flat surfaces;

wherein the upper cup is stopped from being moved in a first direction when the block is abutted against the first stop wall and in a second direction when the block is abutted against the second stop wall, with the first direction opposite to the second direction; and wherein the lower cup includes the first end received in the head tube and the first hole receiving the steering tube when the bicycle headset interconnects the steering tube and the head tube.

2. The bicycle headset as claimed in claim 1, wherein the upper cup includes two cavities extended in the second surface and distanced from each other, with the channel interconnecting the two cavities, with the upper cup including two shock dampers insertably disposed in the two cavities respectively, with the first and second stop walls defined on the two shock dampers respectively.

3. The bicycle headset as claimed in claim 1, wherein the lower cup includes a recess extended in the second end, with the block insertably disposed in the recess.

4. The bicycle headset as claimed in claim 1, wherein the block includes a top end, and a bottom end opposing to the top end and disposed on the first surface, with the top end distanced from the first surface at a first height, and wherein the channel includes a bottom wall facing and spaced from the top end, with the bottom wall distanced from the first surface at a second height, with the first height smaller than the second height.

5. The bicycle headset as claimed in claim 1, wherein the block includes an arc shape including two arcuate first lateral sides disposed opposite to each other and two second lateral sides extending radially between the two first lateral sides, with the block including first and second distal ends defining the two second lateral sides respectively.

6. The bicycle headset as claimed in claim 5, wherein the block includes the two first lateral sides having the same radius of curvature and distanced from each other at a first width, with the block further including the two second lateral sides distanced at a second width, with the second width larger than the first width.

7. The bicycle headset as claimed in claim 6, wherein the channel includes two arcuate first lateral peripheral walls disposed oppositely and distanced from each other at a third width, with the third width larger than the first width.

8. The bicycle headset as claimed in claim 1, wherein the pressed ring is rotated with the upper cup and includes first and second terminal ends and has a longitudinal length defining a distance between the first and second terminal ends, with the pressing ring further including a peripheral edge and a slit extending radially through the peripheral edge and connecting with the third hole, with the slit including first and second terminal ends forming two openings.

* * * * *